Figure 1:
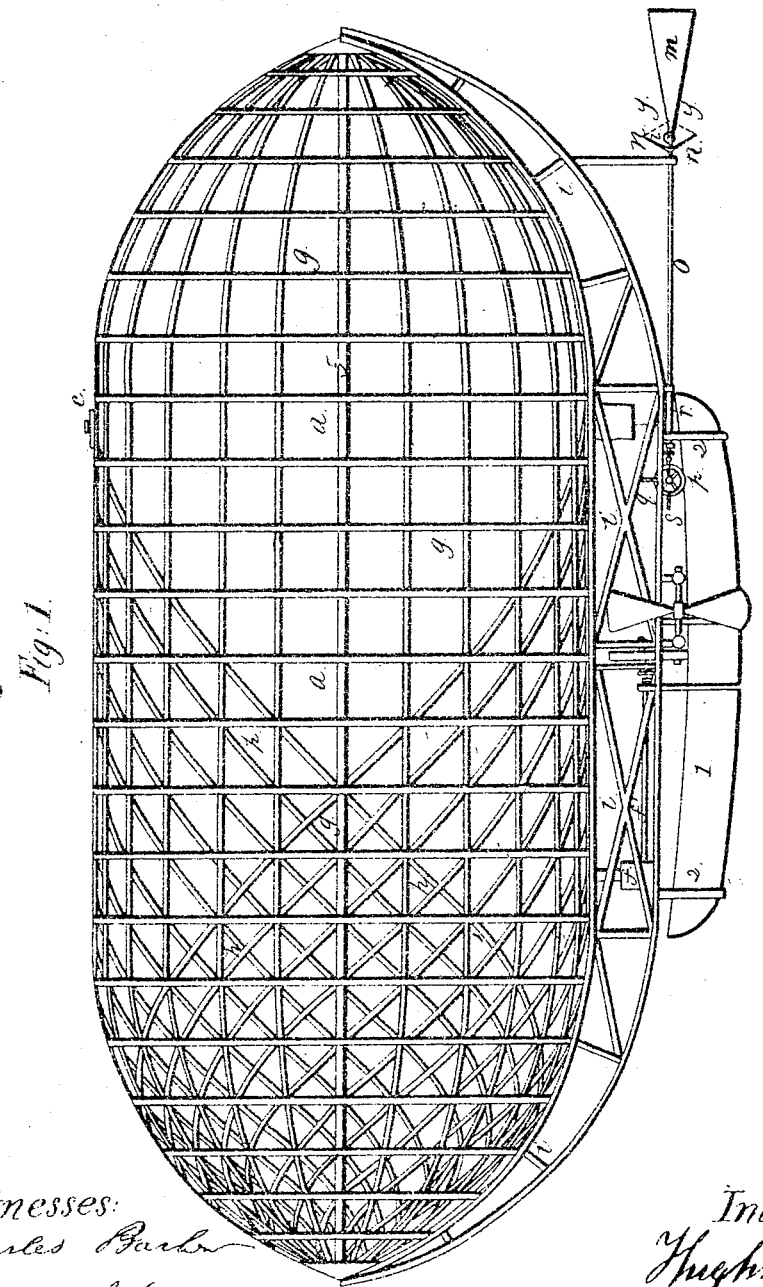

H. BELL
BALLOON.

No. 7,207. Patented Mar. 26, 1850.

Witnesses:
Charles Barber
Charles Johns

Inventor
Hugh Bell

H. BELL.
BALLOON.
No. 7,207. Patented Mar. 26, 1850.
7 Sheets—Sheet 2.
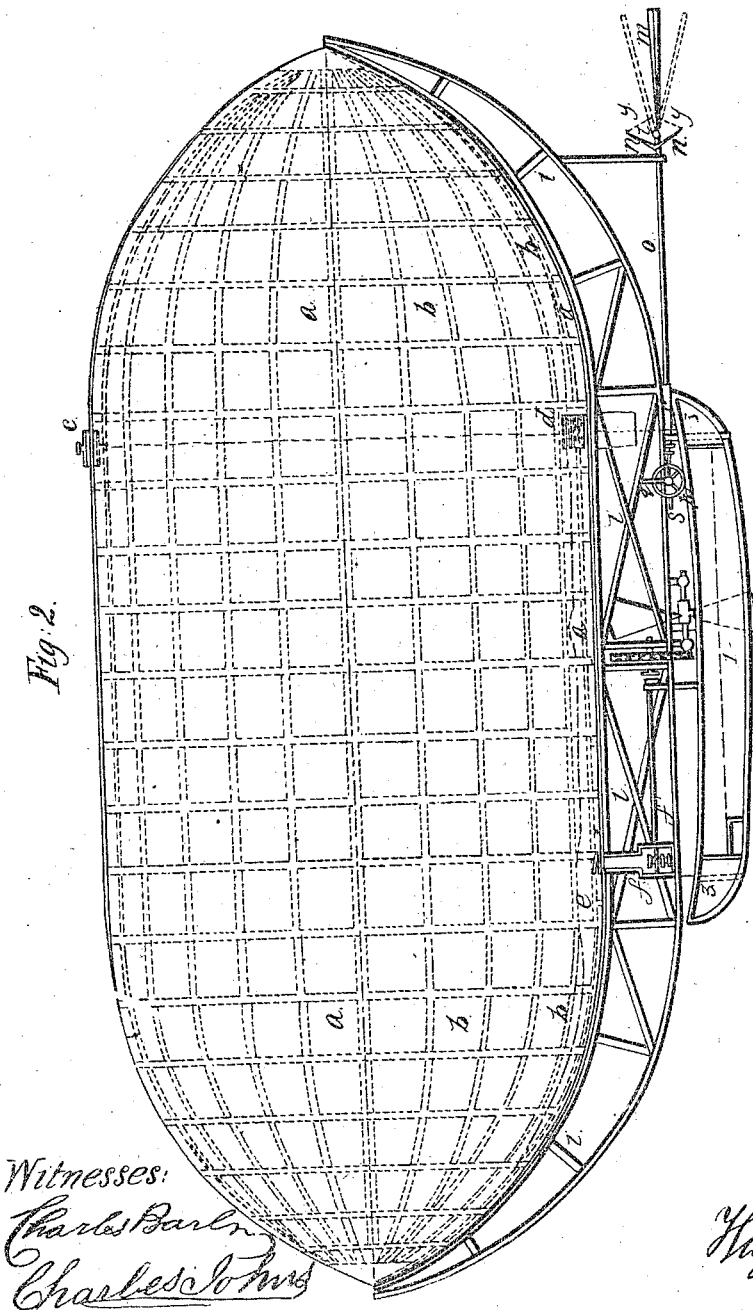

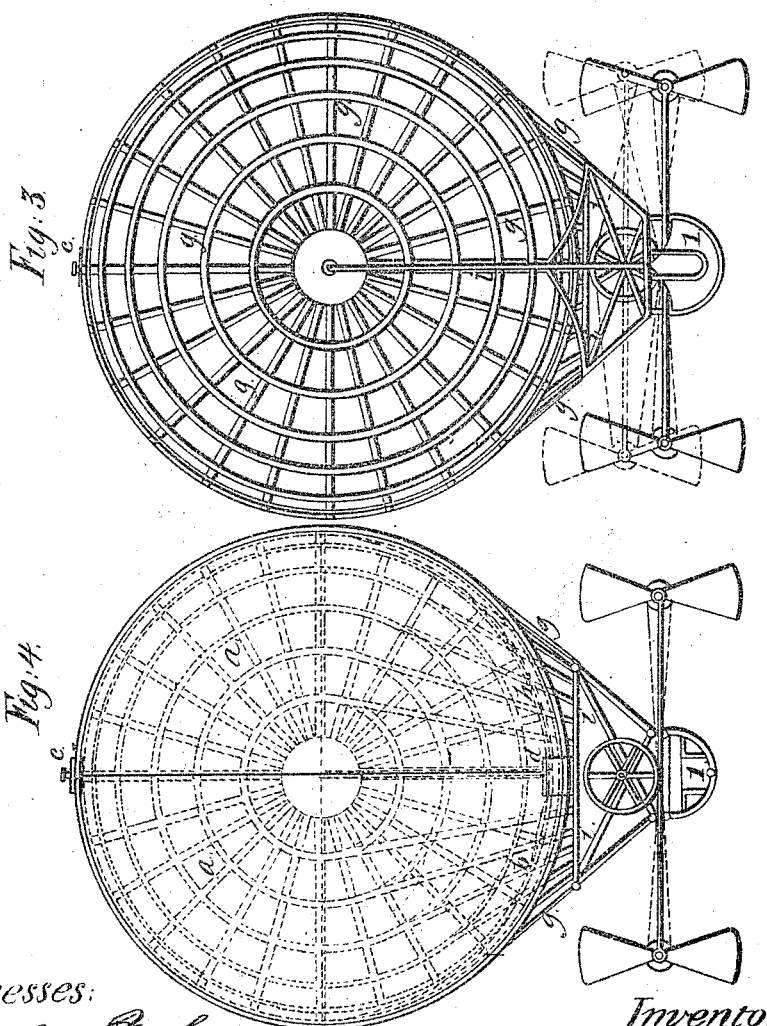

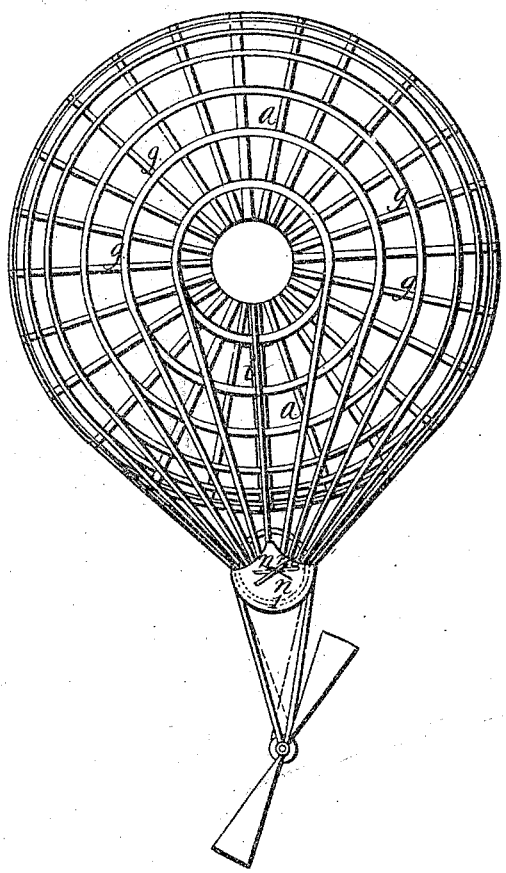

H. BELL.
BALLOON.
No. 7,207.  Patented Mar. 26, 1850
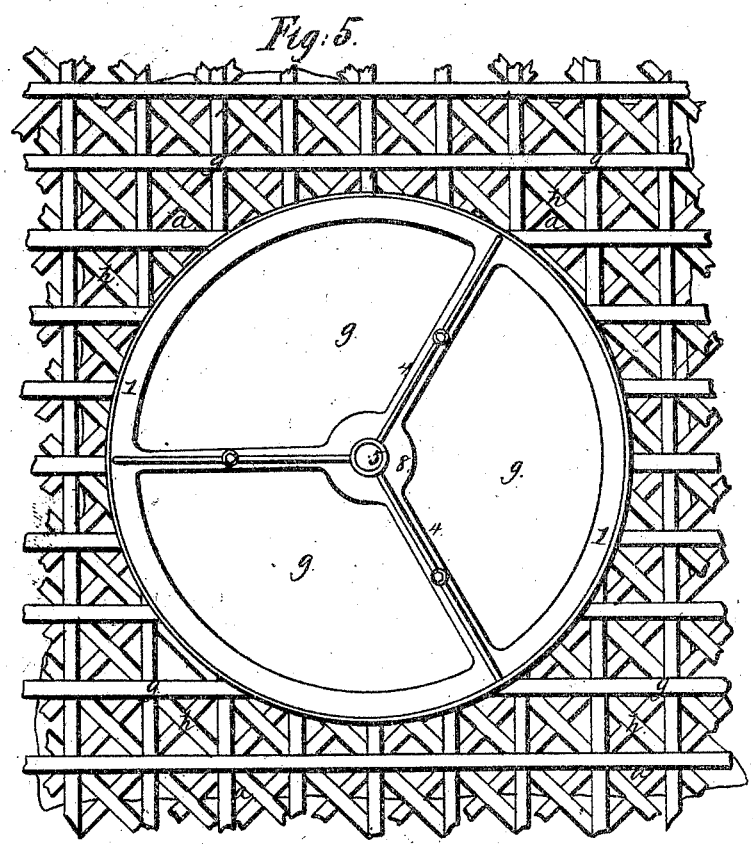
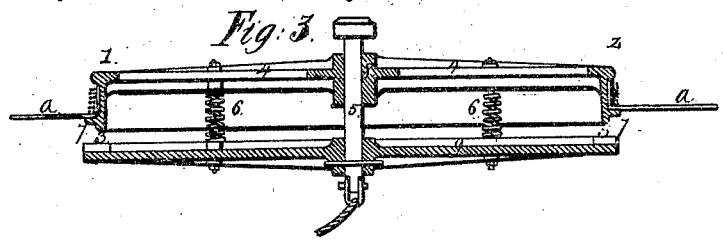
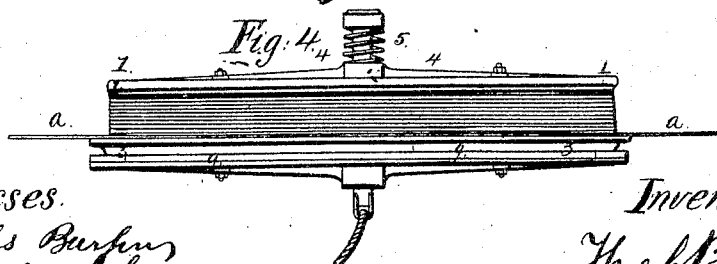
Witnesses.
Charles Burton
Charles Johns
Inventor.
Hugh Bell H. BELL.
BALLOON.
No. 7,207. Patented Mar. 26, 1850.
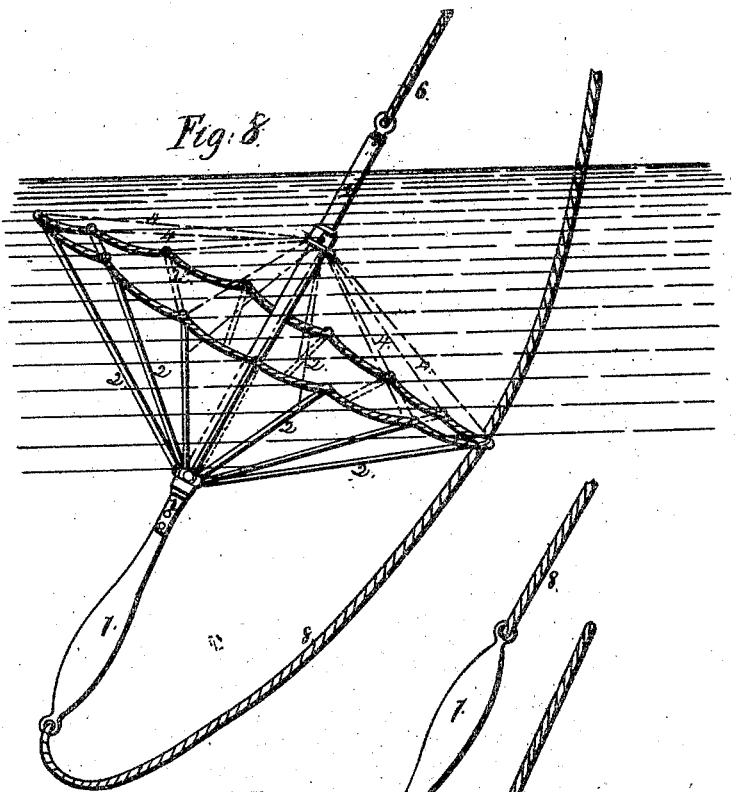
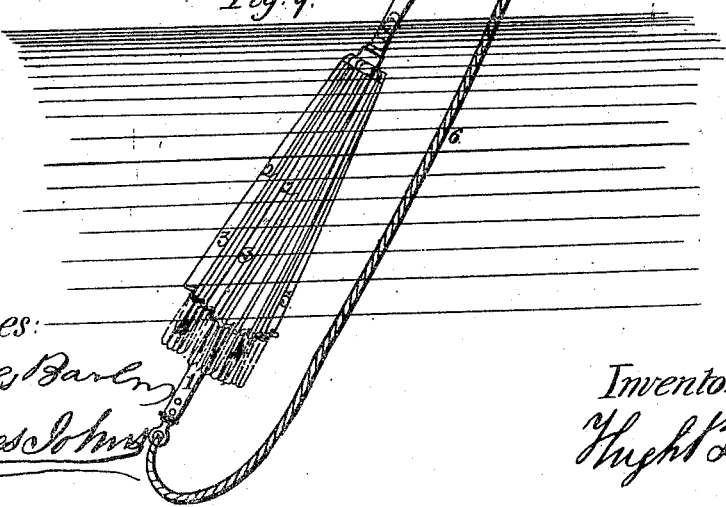
Witnesses:
Charles Barlow
Charles Johns
Inventor:
Hugh Bell

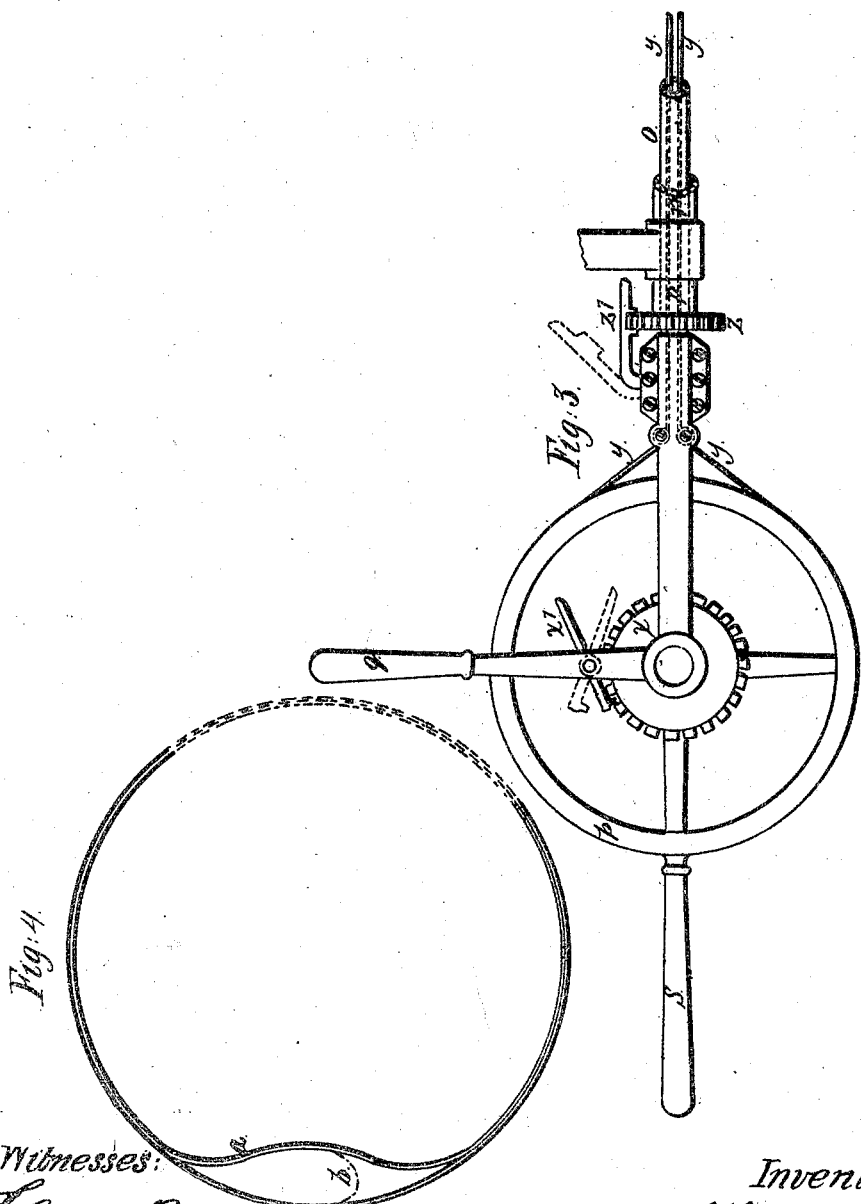

UNITED STATES PATENT OFFICE.

HUGH BELL, OF LONDON, ENGLAND.

BALLOON AND ITS APPENDAGES.

Specification of Letters Patent No. 7,207, dated March 26, 1850.

*To all whom it may concern:*

Be it known that I, HUGH BELL, esquire, of London, in the Kingdom of England, have invented certain Improvements in Aerial Machines and Machinery in Connection with the Buoyant Power Produced by Gaseous Matter.

My invention relates to improvements in aerial machines and in apparatus to be used in connection with the buoyant power produced by gaseous matter.

In any aerial motor machines the suspending power is upon the principle of the balloon. It is combined with motive power for the purpose of propelling—the form of the balloon or buoyant part being modified for passage through the air and may be termed the balloon motor machine.

1stly, balloon motor machine: This in its complete form is composed in the first place of a buoyant apparatus; 2ndly, of a frame work and car to one of which is attached an apparatus capable of producing motive power; 3rdly, of a guiding or steering apparatus, and, 4thly, of apparatus for arresting the progress of the machine over water and land.

I will now proceed to describe my invention with reference to the balloon motor machine which is represented in the figures, Sheet 1.

The balloon or bag containing the buoyant gas I construct of an elongated form having its greatest length placed in a more or less horizontal direction fore and aft (I use these terms to distinguish the advance from the rear end of the balloon in its passage through the air as in the ordinary acceptation of those terms on shipboard) no matter whether the form be pearlike, that of two cones placed base to base a cylinder with cones at the extremities or any of those forms flattened laterally or vertically. Any one of these forms present very considerable diminution of resistance to the atmosphere on being propelled through it in the direction of its length as compared to the usual form of the ordinary balloon. I believe the best form to be somewhat like that shown in the drawing having less length in the cylinder in proportion to the somewhat cone like forms at the extremities.

There are one or more membranes contained within the balloon if a single be used which I believe to be the most simple and most efficient it is to be placed across the cavity of the balloon and attached all around in a horizontal line to about where the upper and lower halves of the balloon membrane meet or somewhat below this it should be sufficiently loose to admit of the balloon being distended with buoyant gas above that membrane without interfering with its capacity further than by its own thickness which of course would be very trifling. This partition membrane is shown in Figs. 2 and 4, Sheet 1, which are longitudinal and transverse sections of the machine, $a, a$ representing the membrane of the balloon and $b\ b$ the septum membrane. It is seen to be close to the lower half of the balloon, the situation it would occupy when the cavity above it is distended with gas having little or no atmospheric air beneath it or between it and the lower half of the balloon. The only other attachment it would have is at the bottom part of the balloon where the rope from the top emptying valve $c$ passes through the safety gas valve $d$ to be within reach of the aeronaut. This should be a cylindrical passage supported by hoops so as to prevent any possibility of the membrane becoming jammed and fouling the valve rope. The emptying valve might be situated elsewhere, as at the after extremity of the balloon above the septum membrane $b\ b$ to be acted upon by a rope from the outside. In this case the hooped part of the partition membrane would be unnecessary and it would be left attached by its margin only. The septum membrane $b\ b$ should prevent as much as possible all communication of atmospheric air (if any were beneath it) with the buoyant gas above it. If a balloon with this partition membrane be filled with gas above the "septum" $b\ b$ to about three fourths of its contents and the remaining quarter beneath the septum with common air so as to distend it the balloon may at moderate and at the same time variable elevations always be kept tense without any escape of gas being necessary for on the expansion of the whole contents of the apparatus while ascending in the atmosphere it is so arranged that all the atmospheric air beneath the septum $b\ b$ would escape before any of the buoyant gas could do so from the balloon above. This is effected by means of a valve $c$ constructed so as to open at a much less pressure than the safety gas valve $d$. On approaching the earth the buoyant gas would again become condensed causing the balloon membrane to become lax, to counteract which atmospheric air should be injected by the blowing machine *f* or other suitable apparatus into the space beneath the septum *b b* from, which it has been suffered to escape and thus obviate the otherwise flaccid state into which it would fall. And if this septum *b* be nearly equal in extent of surface to one horizontal half of the balloon it may be kept tense longer than there could possibly be sufficient buoyant power to support the machine in air. The object of this arrangement is to facilitate the rapid motion of a large machine of this kind through the air and without which it would be impracticable, as will be evident to any one who has seen a half filled balloon bag with the wind; under which circumstance any propelling power would if attempted be attended with considerable danger to the balloon.

The air injecting or filling apparatus *f*, may be either a large light syringe with valves or an apparatus similar to the patent bellows fitted with a single valve to be worked by the hand or by other driving power employed for propelling by the shaft *f'*. The septum *b b* having no tension to resist but merely to prevent the buoyant gas and atmospheric air becoming diffused or intermingling with each other, may be so thin as to weigh but a few pounds and the air injecting machine may be very small if worked by effective motive power. It may be here stated that if the propelling power be efficiently applied to one of the forms of the buoyant machines above mentioned in its distended state it would easily compensate for several pounds above the weight of the arrangement of apparatus just described by the increased ease with which it would pass through the air on being propelled obliquely upward. It would never be requisite to take up any atmospheric air in the space between the septum and the lower half of the balloon it is only to be forced in when the balloon as collapsed from a deficient quantity of gas. The buoyant gas gradually escaping from this machine while ascending in the air may be made use of to heat the water to produce steam should such be used as of the propelling power. The membranes used in the construction of the buoyant apparatus should be of such material or preparation of material as may be most fitted to prevent exosmose and endosmose combined with the greatest possible lightness such as silk or preparations thereof.

In place of the netting in common use for strengthening the balloon and affording an attachment to the framework or car I use flat bands *g g g* those made of silk I believe will be found to give the greatest strength combined with the least weight. These bands *g g g* are placed longitudinally and transversely around the balloon *a a* and also diagonally if great strength be required as shown in part at Fig. 1 and stitched where they cross one another or they may be so woven. By this arrangement the advantages gained are greater strength more equal strain, less resistance to motion through the air and less chafing to the silk or membrane *a a* containing the buoyant gas that being very considerable from the knots of the netting in common use, and I also apply a single strong band attached all around at the central horizontal line of the balloon fore and aft and also to the corresponding inside part of the flattened bands. This is shown in the transverse section, Fig. 4, Sheet 3, where the balloon membrane *a* is bulged inward in order to show the connecting band *b* where it will be seen to be attached by both margins one to the balloon membrane *a* and the other to the band work or netting *g*. There should be a lacing in the center of this band all the way around so that when the "flat band" netting is separated from the balloon it may take one half of the band and the balloon the other half. This "separating band" should be so broad as not to interfere with the ordinary relations of the balloon and its netting. The great advantage of this arrangement is as follows: Suppose while in the air all the gas was suddenly let out by the bursting of the balloon with or without rupture of netting above. The impulse toward the earth would cause the lower half membranes to rise and fill or bulge like a parachute and would give the occupants of the car a chance of being brought safe to the ground. Instead of the band 6 being continuous throughout the horizontal circumference it may consist of a series of bands or straps one at each vertical band of the network *g g*.

The construction of my improved valve apparatus used in ballooning, I believe will supersede all that have been hitherto used for preventing the escape of gas, and this from the ease with which it may be opened and closed at the will of the aeronaut. If its surfaces are reversed and fitted to any part of the balloon where it is wished that the gas should escape on the tension reaching a certain point and the springs or vulcanized india rubber be regulated to that pitch it forms a certain safety valve admitting of the escape of gas when it has exceeded that pitch. In these representations it is supposed to be in the situation of that in which the valves are placed in the ordinary balloon and to be acted on by the aeronaut by means of a rope attached to the lower plate. Fig. 3, Sheet 2, represents a vertical section; Fig. 4, a side elevation of this improved valve. 1, 1, is the rim or valve seat in one piece with the bridges 4, 4. The valve plate 9 is larger than the part against which it would pass which is the beading 7—7 on the under surface of the ring 1 which should be as thin as is consistent with the strength required and sufficiently deep to allow the springs 6—6 to act freely and draw the elastic material 3—3 with which the valve is forced against the bead 7—7. Through the collar 8—8 which is bored true with the face of the valve is a sliding rod or tube 5 fixed to the movable valve plate 9 the motion that is permitted being evident from a comparison of the relative positions of the two valve plates 9—9 in the Figs. 3 and 4. The head at the top of the rod preventing its slipping through the collar. If the sliding piece be of tubing with most minute holes in its surface and a little oil be kept in it the sliding motion will be effected in the most perfect manner.

The valve apparatus may be made of brass or iron and the ring piece or pieces of the same material or wood may be used for this purpose if preferred.

Two valves of the above kind may be used in combination more or less modified so that the one acts as a safety valve at the same time that the other may be used as an emptying valve. Instead of employing three springs for the purpose of closing these valves as shown in the figures one central spring only may be substituted, as represented in red lines in Fig. 4, Sheet 2, between the head of the bolt and the collar in which it slides which will have a like effect. Fig. 5 represents a plan of one of these valves showing the balloon membrane $a, a,$ and bands $g, g,$ the breadth of which should be increased so as to add considerably to the strength of the net work and should in all cases be furnished with the diagonals $h\,h$ at this point.

The "frame work" $i—i$, Sheet 1, of the balloon motor machine is composed of metal tubes placed in a longitudinal direction more or less parallel to the under surface of the buoyant machine at such distances from one another and having diagonal pieces of the same so placed between them that the greatest possible strength and stiffness may be combined with the greatest possible lightness. This frame should be of the greatest strength when it corresponds to the body of the buoyant apparatus so as to sustain the force of the impinging or propelling machines it should taper at the same time that it curves toward the ends and as it approaches either apex of the cone and at the extreme ends a single tube may suffice. In the end view, Fig. 5, the frame work is dispensed with as it is not absolutely necessary for the car 1 in the form of a boat may as there shown be made to fulfil its purposes although less completely. The transverse section of the frame is shown in Fig. 4. Although a frame adds somewhat to the weight it very considerably increases the safety and convenience of the whole machine by giving attachment to all machinery which would otherwise encumber the car or boat 1 when in the water by rendering the strain more equal by supporting more effectually the relative positions of balloon membrane and netting and in case of a rent by assisting to form a much more effectual support by keeping the temporary parachute extended. It also renders the detaching of the car or boat in case of accident over the sea much less difficult by having more rigid points for the tackles to lower the boat from.

I form the car 1 so as to fulfil the purposes of a canoe or boat, such as is represented in the different views in Sheet 1. It is placed parallel to and fastened beneath the buoyant apparatus by the bands $g\,g$ before mentioned if there be no frame work (as at Fig. 5) or if there be a frame work beneath (as shown in Figs. 1, 2, 3, and 4) it is attached thereto by tackles 2, 2, from which it is readily cut away when required. The boat 1 should be composed of the lightest and strongest material in combination as sheet iron or other metal or of a frame of tubing or basket covered with gutta percha or any other material inpervious to water or made only of gutta percha. It should have air tight cavities 3—3 at each extremity with openings in them above to be closed only when in water so as to be used should there be occasion as a life boat and fitted with mast sail oars or sculls and a screw propeller may be of advantage if fitted with suitable appliances for working the same. In constructing this framework the tubing is curved to the proper shape the diagonal and other stays being connected to the main framing by knee or angle pieces in the ordinary manner of connecting gas tubing each knee piece being formed of the proper angle to effect the requisite connection. In the construction of impinging machines for propelling, one of the best forms is that made on the principle of the common screw propeller used in steam vessels one or more of which may be used. The axis or axes should be more or less parallel to the axis of the buoyant apparatus. The materials used in the construction of a screw may be various as the frame of metal tubing wire and rods covered with silk metal sheet or papier mâché. If two propellers are used they may be placed one on each side and acted on from the bar or framework by an endless cord. If but one screw be used it may be situated either beneath as seen at Fig. 5 or behind the car boat or framework to be worked by any convenient power with or without the intervention of a fly wheel.

Fig. 3 represents an end view of the balloon motor machine in which the red lines show a different position of the propellers which would perhaps be better adapted for propelling than that shown in the other figures as being closer to the resisting area of the machine and equally within the command of the aeronaut.

During the passage of this aerial machine through the atmosphere it is necessary to employ some apparatus for guiding their movements which I term the steering or tail apparatus (from the similarity to the tail of a bird) which has imparted to it two motions the one a hinge motion and the other a rotating motion combined for the purpose of obtaining the necessary movements of an extended surface or fan more or less approaching to those of the tail of the bird so that the guiding or directing the whole machine when in motion in every direction may be at the command of the aeronaut. The tail apparatus which is represented in Figs. 1, 2, and 5, Sheet 1, is composed of a frame more or less in the form of a bird's tail over which some membrane may be stretched or it may be made wholly of metal this moved upon a hinge joint $l$ by means of a running cord or chain $y\ y$ passing from either surface of the tail fan $m$ over the pulleys on the ends of the branches of tubing $n\ n$ passing down into the axis tubing $o$ through which it is conveyed to the priphery of the wheel $p$ situated at the extremity of this tubing as represented in the frame work or it may be in the car or boat by these means a complete hinge motion is obtained. By turning the wheel $p$ on its axis by the handle $s$ in either direction the one cord will be taken up on the periphery while the other will be slacked out causing the extremity of the tail to depart from the straight line the wheel apparatus being represented on a large scale at Fig. 3, Sheet 3. The partial rotation of the whole tail apparatus just mentioned is effected by the motion of a small lever $q$ attached to the arms on each side of the wheel in which its pivot works the arms being firmly attached to the tubing $o$ on which the hinge of the tail fan $m$ works this tube is rotated by moving the lever to either side and hence it is called the axis tube the tube in which it has the rotary motion is marked $v$. In Fig. 3, Sheet 3, will be seen that two ratchets or fixing wheels are represented for the purpose of securing the tail $m$ in its different positions $x$ is attached to the wheel which is held at any required point by the click $x^1$ which adjusts the position of the tail on its hinge motion as before explained by the cords $y\ y$ while the ratchet wheels $z$ with its tube $v$ is affixed to the frame work secures the whole apparatus in any position obtained by its rotation with the tube $o$ by means of the click $z$ where the rotary movement has to be produced out of the straight line as when the tail is situated much above or below the level of the boat as would be the case were it situated at the after extremity of the balloon or behind a single screw placed beneath the boat a line may be made to act over a wheel fixed upon a short axis tube immediately before the hinge by means of another similar wheel in reach of the aeronaut through a succession of pulleys the hinge wheel would act in the same way although it might be placed transversely and its line would not pass through a straight tube admitting of a rotary motion. The first mode of producing the hinge motion and slight rotation of that hinge being the most simple is that which I prefer. The results from the above combinations of the hinge motion and rotary motion are that the fan may be made to bend on its hinge in any direction of a circle namely up or down or laterally in any diagonal of these motions consequently the direction of the whole machine when moving sufficiently for steerage through the atmosphere may be changed upward or downward to either side or to any diagonal of any of these on the same principle as the bird directs its course by the motion of its tail which will be readily understood by reference to Figs. 2 and 5, Sheet 1, where the dotted lines show the different positions.

My improvements in machines for arresting motion in aerial machines over the surface of water or land consists of, 1st, an apparatus which I term "water grapnel," represented in Figs. 8 and 9, sheet 2, in the expanded and collapsed states. Its general form is seen to be that of an umbrella. The ribs 2, 2, 2, are made of iron, brass or metal tubing and the covering 3 3 3 which is fastened firmly to the ribs, of very strong cloth prepared so as to be impervious to the water. The ribs 2—2 are hinged at one end and connected at intervals by strong cords 4—4—4 to the collar 5 at the neck of the center rod 1, 1, so as to prevent the ribs opening more than to a certain extent. To the short end of the rod above the collar a strong rope 6 is attached and also to the balloon. The ferrule end 7 is lengthened and of solid metal while the rod 1 is of tubing and another small rope 8 is attached to it at its extremity. When it is intended to arrest the progress of a balloon as much as possible while at sea this machine is to be collapsed and tied up like an umbrella but with a thread or slight cord that will easily break. The apparatus is now to be let down rapidly by the larger rope the smaller one being slack the heavy end descends first and is carried deeply into the water before the aerial machine can ascend much from the diminution of weight produced the moment that the rope becomes tight the thread around the umbrella will give way when it opens immense resistance to its passage through the water is produced by the body of water it contains. The aerial machine may now in fact be said to be moored to the water. When it is wished to have the grapnel up again and to proceed the great rope 6 is to be slackened and the small rope to be hauled upon by this the water grapnel has its ends reversed when it collapses as seen in Fig. 9 and the only resistance to its being hauled up is its own weight and the friction arising from its passage through the water. It may be observed that a grapnel either for water or the common one used for land should be dropped if possible while the aerial machine is kept as nearly as possible over the same spot of surface. Again the grapnel rope whether for land or water should have a long piece or pieces of vulcanized caoutchouc of its whole breadth or one or more springs proportionably strong in its rope or the rope should be of an elastic material by these means the sudden jerk occassioned by " bringing too " is felt in using the common rope from the ordinary balloon when the wind is fresh will be in a great measure prevented.

When steam power is used the generation of steam from water may be produced by the combustion of coal spirit ether oil or gas or other hydrocarbons, the laxity which would arise from the escape of gas being counteracted by forcing atmospheric air into its proper receptacle by the apparatus already mentioned. Now suppose that there is a large quantity of ballast in the shape of coal or any inflammable fluid for the production of heat applied to water to produce steam by the consumption of the coal and water. The balloon becoming specifically lighter would rise in the air the consumption of coal or any inflammable fluid should now cease and the gas be allowed to pass through the tube to be ignited beneath the boiler as the balloon became lax air must be pumped or injected into its proper receptacle after a time the balloon would gradually diminish in buoyant power until if allowed it would sink to the ground if at this time water be required a small quantity so as not to increase much the specific gravity of the machine may be caught up by a bucket the machine being made to oppose the wind so as to keep it for the time over the water as stationary as possible. The coal or fluid ballast is now to be made use of. If the machine has a tendency to descend it may be kept up by being propelled in an oblique direction upward until by the use of the ballast the specific gravity has become equal to the air it is moving in. The discharging only a portion of ballast or gas alternately by using it to produce heat for the generation of steam carried to a very slight extent would be sufficient in most cases to get into any current of air or even to pass to the trade winds to be carried a considerable part of the way toward its destination without incapacitating the machine from returning to the same means again and again in case of adverse winds until it could arrive at its destination or obtain a supply of fuel and gas from a station.

It must be recollected that taking two or three miles of atmosphere upward from the surface of the earth that there are various currents in different directions. This is not necessarily the case but is I believe most frequently found to be so. Under the circumstances it would be necessary only to pass from one current to another until one was found more or less fair and to keep in this current without propelling if it were of the same specific gravity as the machine or if not to use such propelling power as by steerage would keep the machine in this favorable stratum often would the current be sufficiently strong to carry along the machine for a considerable time without any propelling power until another current were met with on the same level or one passed into either above or below which would counteract any previous deviation of course. Short flights and toward the close of long flights only would require great nicety in the direction of its course. It is not absolutely necessary that the buoyant power should in all cases be sufficient of itself to support the machine in air without the propelling power but that it should be sufficient to prevent concussion on alighting on the ground to cause injury to passengers or machine. The propelling power when in action would be sufficient to keep the machine up when the latter is steered in an oblique direction upward by the helm or tail even if there should be considerable deficiency of buoyant power so that were the propelling power to cease the machine must at once descend to the ground. There would be certainly considerable difficulty in stopping at different places when the wind was high the same amount of wind which admits of a common balloon being retained on the ground previous to starting also admits of the balloon motor machine being retained by the grapnel especially as its form is better adapted for admitting of its passing more easily through the atmosphere the propellers also would assist much and would when in action according to the resistance from the wind in most cases be quite sufficient to enable the balloon motor machine to remain over the same spot of ground. The detaching of the boat from the frame work is to be effected at sea by using the water grapnel, lowering away the boat by means of the tackles 2 2 and then on a favorable opportunity offering when the boat is just arrived at the surface of the water in the descent of the balloon suddenly to detach both tackles (the use of one only if possible is much to be preferred). The balloon should be retained if it would assist in the direction of course required provided it be sufficiently sound to retain gas by means of a rope at the head of the boat or if not all the gas should be let out of the balloon which should be stowed away in board. Recourse should be had to detaching the boat only when some accident had happened so as to render it not sufficiently buoyant or safe.

Having described the nature of my invention and the manner of carrying the same into effect I would have it understood that I do not confine myself to the precise details herein set forth; but

What I claim as my invention and desire to be protected under Letters Patent—

1. The application of one or more flexible partitions which I have termed the "septum membrane" to balloons for the purpose hereinbefore described.

2. I claim the application of a rotary motion in conjunction with a hinge motion for the purpose of producing motion in the fan or blade forming the tail which motion is more or less assimilated to that of a bird's tail in order to effect the steerage substantially in the manner herein described.

3. I claim the use of the water grapnel for the purpose of arresting the motion of aerial machines and also the application of elastic ropes to grapnels either for land or water and which elastic ropes may be formed entirely of elastic material or by introducing some elastic material or metal spring in its length.

4. And lastly I claim the construction of the valve shown in the Figs. 3, 4, 5, Sheet 2, as applied to balloons in which the valve or plate during its motion retains a position parallel to its seat.

HUGH BELL.

Witnesses:
JOSEPH MARQUETTE,
CHARLES JOHNS.